May 19, 1931.  A. B. SAUNDERS  1,805,743

SHEET CUTTING MACHINE

Filed Aug. 29, 1929

Inventor.
Arthur B. Saunders.
by Roberts, Cushman & Woodbury
Atty's.

Patented May 19, 1931

1,805,743

UNITED STATES PATENT OFFICE

ARTHUR B. SAUNDERS, OF NASHUA, NEW HAMPSHIRE

SHEET CUTTING MACHINE

Application filed August 29, 1929. Serial No. 389,185.

The present invention relates to a sheet cutting machine and more particularly to a device for trimming the edges of a sheet of asbestos and cement while it rests on an endless belt conveyor, the sheet being mechanically conveyed to and from the cutting position.

For the purpose of illustrating this invention I have elected to show and describe a machine particularly constructed for trimming the edges of a rectangular sheet of asbestos and cement preferably located to act upon the sheet as soon as it leaves the making machine. The cutter is formed with this end in view by four cutting blades supported by a frame and disposed so as to form a rectangle. The sheet is brought underneath the cutter by means of an intermittently operating endless belt conveyor mechanism. The cutter is operated by lowering the frame until the blades engage and trim the edges of the sheet. Upon lifting the cutter, the mechanical transportation of the sheet towards other finishing machines takes place automatically while the waste portions drop to the floor.

The conveyor mechanism may consist of three or more endless belt conveyors, each transmitting motion to the other, so as to obtain a continuous progressive movement. The intermittent operation of endless conveyors is timed to allow a moment of rest when a sheet is directly underneath the cutter. As the sheet remains on the endless conveyor during the cutting operation it is necessary that the conveyor underneath the cutter be entirely hidden by the sheet to be cut and that no part of that conveyor extend outside of the rectangular cutter. The vertical reciprocation of the cutter will be preferably obtained by means of a swivelling lever mechanism driven by means of a crank.

Figure 1:
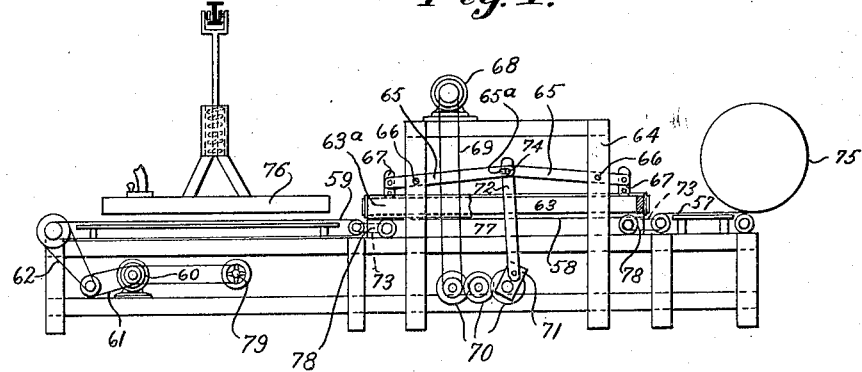

The elected machine will be described hereafter with reference to the figures of the accompanying drawings, in which:

Fig. 1 is a front elevation; and

Figure 2:
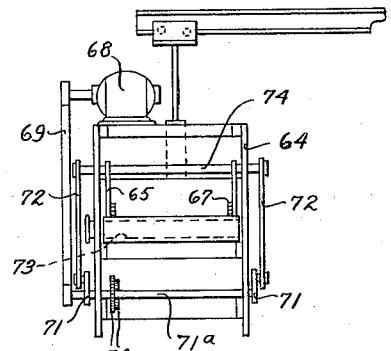

Fig. 2 an end elevation.

Figure 3:
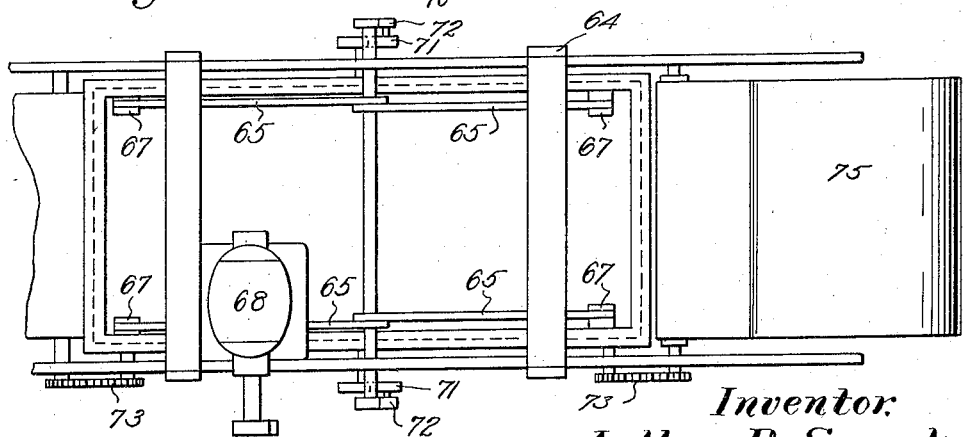

Fig. 3 is a plan view of a portion of the apparatus on an enlarged scale.

The conveyor mechanism for this machine comprises three endless belt conveyors 57, 58 and 59 respectively of known type and mounted on a common frame. The machine is positioned near to the pick-up drum 75 of the cardboard machine from which the sheet of asbestos and cement comes forth in plastic condition. The sheet leaving the drum 75 rests upon the conveyor 57 which is transferred to the conveyor 58 and while on that conveyor, the edges of the sheet will be trimmed by means of the cutter. The trimmed sheet is then delivered to the conveyor 59 from which it is removed by any suitable means as for example by a vacuum lift 76.

The cutter by which the sheet on the conveyor 58 is trimmed, comprises a rectangular frame 63 on which four cutting blades 63$^a$ are rigidly assembled. The frame 63 is suspended in a frame 64 so as to be reciprocated vertically by means of the levers 65 pivoted intermediate their lengths to the frame 64 at 66 and at the outer ends to links 67 upon which the cutting frame 63 is suspended. The cutter frame is reciprocated by an electric motor 68 mounted upon the frame 64 and acting through a belt 69 and reducing gears 70 to rotate a shaft 71$^a$. Mounted upon the ends of the shaft 71$^a$ are cranks 71 to which the lower ends of rods 72 are connected. The upper ends of the rods 72 are fixed to the ends of a shaft 74 which passes through slots 65$^a$ formed in the overlapping inner ends of the levers 65. Through the mechanism thus described the motor 68 will cause the levers 65 to rock on their pivots 66 and the links 67 will thereupon raise and lower the cutting frame 63.

The endless conveyors are simultaneously and intermittently driven by an electric motor 60 through belts 61, 62 and speed reducing gears not shown. A manual control 79 is provided to regulate the speed of movement of the conveyors as may be required to insure that the conveyor 58 when at rest locates a sheet in the position for trimming. The conveyors are connected by linked chain transmissions 73 situated outside the frame 64 and including pinions of a common diameter.

The conveyor 58 will of course be of smaller dimensions than the cutter, so that the cutter blades will not damage the conveyor or the chain 73, and the sheet resting on said conveyor 58 will be so positioned that its four edges will project beyond the conveyor and be cleanly cut by the cutting blades. The sheet being treated is plastic and must be fully supported and hence a fixed support may be provided, upon which the edges of the sheet will rest during the cutting action. The support is arranged so as not to obstruct the movement of the conveyor 58 and may comprise a rectangular frame 77 surrounding the conveyor 58 and including crossbars 78 which pass between the conveyors 57 and 58 and 58 and 59 respectively. The outer edges of the crossbars coact with the cutting blades in trimming the sheets. The sheet is thus supported during the trimming operation and the scraps drop on the floor while the finished sheet is transferred to the conveyor 59 upon the succeeding movement of the conveyors.

While one embodiment of this invention has been shown and described, it will be understood that applicant is not limited thereto, and that other embodiments can be made without departing from the spirit and scope of the invention as set forth in the following claims.

I claim:

1. A machine for trimming sheets of asbestos and cement including a rectangular cutter, means for vertically reciprocating the cutter, and a conveyor for transporting the sheets to be cut and supporting them during the cutting operation, said sheets projecting beyond the edges of the conveyor support and the cutting blades engaging the projecting portions of the sheets.

2. A machine for trimming sheets of asbestos and cement, including a cutter frame, blades supported upon the frame, means for vertically reciprocating the cutter frame and blades, an endless belt conveyor for transporting sheets to be cut and supporting them during the cutting operation and a frame surrounding the conveyor upon which the edges of the sheets rest, the edges of the frame coacting with the blades to sheer the overhanging edges of the sheets.

3. A machine for trimming sheets of asbestos and cement, including a cutter frame, blades supported upon the frame, means for vertically reciprocating the cutter frame and blades, a plurality of endless conveyors for transporting the sheets to be trimmed, means for actuating said conveyors intermittently one of said conveyors being below the cutter and supporting the sheets during the cutting operation, the edges of the sheets projecting beyond the conveyor whereby the cutting blades avoid cutting the conveyor while trimming the edges of the sheet.

4. A machine for trimming sheets of asbestos and cement, including a cutter frame, blades supported upon the frame in the from of a rectangle, means for vertically reciprocating the cutter frame and blades, a plurality of endless conveyors for transporting the sheets to be trimmed, means for operating the conveyors intermittently, one of said conveyors being below the cutter and supporting the sheets during the cutting operation, and a frame surrounding said conveyor upon which the edges of the sheets rest, the edges of the frame coacting with the cutter blades to shear the overhanging edges of the sheets.

Signed by me at Nashua, N. H., this 27th day of August 1929.

ARTHUR B. SAUNDERS.